United States Patent
Asquith et al.

(10) Patent No.: US 11,010,123 B2
(45) Date of Patent: May 18, 2021

(54) COMPUTER SYSTEM PROVIDING ENHANCED AUDIO PLAYBACK CONTROL FOR AUDIO FILES ASSOCIATED WITH REALLY SIMPLE SYNDICATION (RSS) FEEDS AND RELATED METHODS

(71) Applicant: PODUCTIVITY LTD, Barnsley (GB)

(72) Inventors: Mark Asquith, Sheffield (GB); Kieran McKeefery, Sheffield (GB)

(73) Assignee: PODUCTIVITY LTD., Barnsley (GB)

( * ) Notice: Subject to any disclaimer, the term of this patent is extended or adjusted under 35 U.S.C. 154(b) by 11 days.

(21) Appl. No.: 16/205,526

(22) Filed: Nov. 30, 2018

(65) Prior Publication Data
US 2020/0174736 A1    Jun. 4, 2020

(51) Int. Cl.
G06F 3/16        (2006.01)
H04L 29/08       (2006.01)
H04L 29/06       (2006.01)
G06F 3/0484      (2013.01)

(52) U.S. Cl.
CPC .......... *G06F 3/165* (2013.01); *G06F 3/04842* (2013.01); *H04L 67/26* (2013.01); *H04L 67/42* (2013.01)

(58) Field of Classification Search
CPC ..... G06F 3/165; G06F 3/04842; H04L 67/26; H04L 67/42
See application file for complete search history.

(56) References Cited

U.S. PATENT DOCUMENTS

| | | | | |
|---|---|---|---|---|
| 8,069,464 | B2 * | 11/2011 | Pickens | G06Q 30/0244 705/14.43 |
| 8,180,895 | B2 * | 5/2012 | Neumann | G06F 16/957 709/224 |
| 8,458,613 | B2 * | 6/2013 | Oshiro | G06F 3/0481 715/716 |
| 8,577,996 | B2 * | 11/2013 | Hughes | G06F 15/16 709/219 |

(Continued)

OTHER PUBLICATIONS

Anonymous "NPR RAD—About Remote Audio Data" https://rad.npr.org; retrieved from internet Dec. 14, 2018; pp. 2.
(Continued)

*Primary Examiner* — Jung-Mu T Chuang
(74) *Attorney, Agent, or Firm* — Allen, Dyer, Doppelt + Gilchrist, PA

(57) ABSTRACT

A computer system may include a server(s) to publish RSS feeds each including a unique ID for an associated audio file. Each audio file may have an action(s) pinned to a respective playback time window within the audio file. A client computing device may cooperate with the server(s) to access a given RSS feed and play the respective audio file, identify the unique ID for the respective audio file from the RSS feed, retrieve the playback time window from the server(s) based upon the unique ID, display a selectable graphical prompt on the display during the playback time window, and send a notification to the server(s) based upon selection of the prompt identifying the unique ID and user-specific information for a user of the client computing device. The server(s) may identify the action(s) associated with the respective audio file based upon the notification, and call a corresponding application based thereon.

17 Claims, 13 Drawing Sheets

(56) References Cited

U.S. PATENT DOCUMENTS

| | | | | |
|---|---|---|---|---|
| 8,738,448 B2* | 5/2014 | Zhang | G06Q 30/0277 | |
| | | | 705/14.73 | |
| 9,043,484 B2* | 5/2015 | Manzari | G06Q 30/02 | |
| | | | 709/231 | |
| 9,066,133 B2* | 6/2015 | Sharif-Ahmadi | | |
| | | | H04N 21/4532 | |
| 9,324,094 B1* | 4/2016 | Chalawsky | H04N 21/2547 | |
| 9,355,413 B2* | 5/2016 | Alwan | G06Q 30/0277 | |
| 9,612,995 B2* | 4/2017 | Lopatecki | H04N 21/2668 | |
| 9,646,322 B2* | 5/2017 | Minnis | G06Q 30/02 | |
| 10,116,537 B2* | 10/2018 | Kellicker | H04L 67/22 | |
| 10,601,684 B2* | 3/2020 | Hashmi | G06T 17/05 | |
| 10,826,807 B2* | 11/2020 | Kellicker | H04L 43/04 | |
| 2002/0174430 A1* | 11/2002 | Ellis | G11B 27/34 | |
| | | | 725/46 | |
| 2005/0198299 A1* | 9/2005 | Beck | H04L 67/00 | |
| | | | 709/226 | |
| 2006/0026067 A1* | 2/2006 | Nicholas | G06Q 30/00 | |
| | | | 705/14.58 | |
| 2006/0168510 A1* | 7/2006 | Bryar | G06F 40/131 | |
| | | | 715/229 | |
| 2006/0248209 A1 | 11/2006 | Chiu et al. | | |
| 2007/0078712 A1* | 4/2007 | Ott, IV | G06Q 30/02 | |
| | | | 705/14.69 | |
| 2007/0078714 A1 | 4/2007 | Ott, IV et al. | | |
| 2007/0136443 A1* | 6/2007 | Sah | G06F 16/9535 | |
| | | | 709/219 | |
| 2007/0156514 A1* | 7/2007 | Wright | G06Q 30/02 | |
| | | | 705/14.41 | |
| 2007/0156621 A1* | 7/2007 | Wright | G06Q 30/02 | |
| | | | 706/48 | |
| 2007/0156887 A1* | 7/2007 | Wright | G06Q 30/02 | |
| | | | 709/224 | |
| 2007/0192327 A1* | 8/2007 | Bodin | G06F 16/9535 | |
| 2007/0214485 A1* | 9/2007 | Bodin | G06F 16/9577 | |
| | | | 725/101 | |
| 2007/0288836 A1* | 12/2007 | Partovi | H04M 3/4938 | |
| | | | 715/202 | |
| 2008/0109832 A1* | 5/2008 | Ozzie | G06F 9/543 | |
| | | | 719/329 | |
| 2008/0189391 A1* | 8/2008 | Koberstein | H04L 67/26 | |
| | | | 709/218 | |
| 2008/0307454 A1* | 12/2008 | Ahanger | G06Q 30/02 | |
| | | | 725/36 | |
| 2009/0013347 A1* | 1/2009 | Ahanger | G06Q 30/02 | |
| | | | 725/36 | |
| 2009/0031339 A1* | 1/2009 | Pickens | G06Q 30/0244 | |
| | | | 725/32 | |
| 2009/0100348 A1* | 4/2009 | Castaignet | H04L 29/00 | |
| | | | 715/751 | |
| 2009/0271175 A1* | 10/2009 | Bodin | G10L 13/00 | |
| | | | 704/2 | |
| 2009/0271176 A1* | 10/2009 | Bodin | G10L 13/00 | |
| | | | 704/2 | |
| 2010/0223107 A1* | 9/2010 | Kim | G06F 16/986 | |
| | | | 709/218 | |
| 2011/0246661 A1* | 10/2011 | Manzari | G06Q 30/02 | |
| | | | 709/231 | |
| 2012/0010976 A1* | 1/2012 | Ramer | G06O 30/0247 | |
| | | | 705/14.46 | |
| 2014/0173660 A1 | 6/2014 | Correa et al. | | |
| 2014/0279064 A1* | 9/2014 | Ercanbrack | G06Q 30/0276 | |
| | | | 705/14.72 | |
| 2017/0195373 A1* | 7/2017 | Toh | G06Q 30/0254 | |
| 2017/0250882 A1* | 8/2017 | Kellicker | H04L 67/16 | |
| 2018/0054366 A1* | 2/2018 | Hashmi | G06F 3/04817 | |
| 2018/0262432 A1* | 9/2018 | Ozen | H04L 12/18 | |
| 2019/0058645 A1* | 2/2019 | Kellicker | H04L 43/04 | |
| 2020/0174736 A1* | 6/2020 | Asquith | G06F 3/04842 | |
| 2020/0259727 A1* | 8/2020 | Hashmi | H04W 24/08 | |

OTHER PUBLICATIONS

Anonymous "Will the Industry Get Rad?" Padeast Business Journal; Dec. 11, 2018; pp. 3.

* cited by examiner

COMPUTER SYSTEM PROVIDING ENHANCED AUDIO PLAYBACK CONTROL FOR AUDIO FILES ASSOCIATED WITH REALLY SIMPLE SYNDICATION (RSS) FEEDS AND RELATED METHODS

BACKGROUND

Really Simply Syndication (RSS), which is sometimes also called Rich Site Summary, is an approach to digital content delivery that simplifies the process of delivering updated content to subscribers via the web. RSS may be used with numerous types of digital files including text, audio, and video, for example. When a content publisher makes new digital content available, the publisher makes an update to an RSS feed file. The RSS file is a simple text file that gives basic information about the file and publisher, and the location where the file may be obtained. User or client computing devices subscribe to the RSS feed using programs called feed readers or feed aggregators. This program checks for updates to the subscribed RSS feeds and obtains new digital content referenced in the RSS feeds accordingly.

While RSS feeds may be used for distributing numerous different types of digital content such as news stories, blog entries, etc., one medium where RSS delivery is particularly useful is podcasts. Podcasts are usually a series of digital audio or video files (i.e., a "show") that users can download from the web for listening or viewing. Podcast creators upload their podcast episodes to podcast hosting services such as Podcast Websites, Libsyn, etc., which make the episodes available via the web along with an RSS feed for the show. The shows may be syndicated by listing the RSS feed with different podcast directories, such as Apple Podcasts, Google Play, Stitcher, etc. This, in turn, makes it easy for the same podcast episodes to be accessed across multiple different types of client computing devices and operating systems from any number of podcast directories.

SUMMARY

A computer system may include at least one server configured to publish Really Simple Syndication (RSS) feeds each including a unique identifier (ID) for an associated audio file. Each audio file may have at least one action pinned to a respective playback time window within the audio file from among a plurality of different actions, with the at least one action corresponding to content within the audio file during the playback time window. The system may further include a client computing device cooperating with the at least one server to access a given RSS feed and play the respective audio file associated therewith, identify the unique ID for the respective audio file from the given RSS feed, retrieve the playback time window from the at least one server based upon the identified unique ID, display a selectable graphical prompt on the display during the playback time window, and send a notification to the at least one server based upon selection of the selectable graphical prompt identifying the unique ID and user-specific information associated with a user of the client computing device. The at least one server may also be configured to identify the at least one action associated with the respective audio file based upon the notification, and call a corresponding application from among a plurality of different applications responsive to the identified at least one action to generate an output based upon the user-specific information.

In one example implementation, each playback time window may have a start time and an end time, the at least one client device may be configured to collect user input within a buffer period of the time window, and the at least one server may be configured to change at least one of the start and end times of the playback time windows for respective audio files based upon user input collected during the buffer periods. In another example implementation, the at least one server may be further configured to change at least one of the start and end times of the playback time window for a first audio file based upon receiving a higher number of selections during a time window for a second audio file different than the first audio file. In still another example, the client computing device may be configured to determine a selection duration from selection of the selectable graphical prompt, and the at least one server may be configured to change at least one of the start and end times of the playback time window based upon the selection duration.

In some embodiments, the at least one action may comprise a plurality of different actions, and the selectable graphical prompt may include a respective region corresponding to each of the different actions. More particularly, the client computing device may be configured to determine a selection location where selection occurs on the display, and the at least one server may be configured to determine a selected action from among the plurality of different actions based upon the selection location.

Furthermore, audio files associated with a same show ID may have a shared action pinned to a same time window therein. More particularly, the audio files associated with a same show ID may also have different actions pinned to different time windows therein. In accordance with one example, the at least one server may be configured to call a corresponding application programming interface (API) responsive to the identified at least one action. In accordance with another example, at least one of the different applications may comprise an electronic mail (email) application configured to output an email message based upon the user-specific information. In still another example, at least one of the different applications may comprise an enrollment application configured to perform user enrollment based upon the user-specific information.

A related method may include publishing RSS feeds from at least one server, where each RSS feed includes a unique ID for an associated audio file, with each audio file having at least one action pinned to a respective playback time window within the audio file from among a plurality of different actions, and the at least one action may correspond to content within the audio file during the playback time window. The method may further include, at a client computing device having a display associated therewith, accessing a given RSS feed and playing the respective audio file associated therewith, identifying the unique ID for the respective audio file from the given RSS feed, and retrieving the playback time window from the at least one server based upon the identified unique ID, displaying a selectable graphical prompt on the display during the playback time window, and sending a notification to the at least one server based upon selection of the selectable graphical prompt identifying the unique ID and user-specific information associated with a user of the client computing device. The method may also include, at the at least one server, identifying the at least one action associated with the respective audio file based upon the notification, and calling a corresponding application from among a plurality of different applications responsive to the identified at least one action to generate an output based upon the user-specific information.

A related non-transitory computer-readable medium may have computer-executable instructions for causing a client computing device to perform steps including accessing a given RSS feed from at least one server and playing a respective audio file associated therewith, where the RSS feed may include a unique ID for the associated audio file, where each audio file may have at least one action pinned to a respective playback time window within the audio file from among a plurality of different actions, and the at least one action may correspond to content within the audio file during the playback time window. The steps may further include identifying the unique ID for the respective audio file from the given RSS feed and retrieving the playback time window from the at least one server based upon the identified unique ID, displaying a selectable graphical prompt on the display during the playback time window, and sending a notification to the at least one server based upon selection of the selectable graphical prompt identifying the unique ID and user-specific information associated with a user of the client computing device to cause the at least one server to call a corresponding application from among a plurality of different applications associated with the at least one action to generate an output based upon the user-specific information.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout, and prime notation is used to indicate similar steps or elements in different embodiments.

As discussed above, Really Simply Syndication (RSS) has become widely adopted for distributing audio and video content to subscribers. Because of its simple format, RSS allows numerous players across different platforms all to access the same digital content in a consistent way, despite the differences between all of these different computing platforms and programs. However, while its relative simplicity is an advantage in this regard, it is also a drawback in the sense that it affords the creators or publishers of digital content little to no control on how the content is played back, or to make the playback experience interactive. For example, an RSS feed has no mechanism to allow a content creator to display a message, etc., at a specific point during playback. Yet, because the RSS format has become ubiquitous across so many different computing platforms and programs, it would be difficult at best to coordinate universally accepted changes to this format to allow for such enhanced functionality. The approach described herein addresses these technical computing challenges of how to provide interactive playback functionality on client computing devices for digital media associated with RSS feeds, yet without having to modify the universally accepted RSS feed format.

Figure 1:
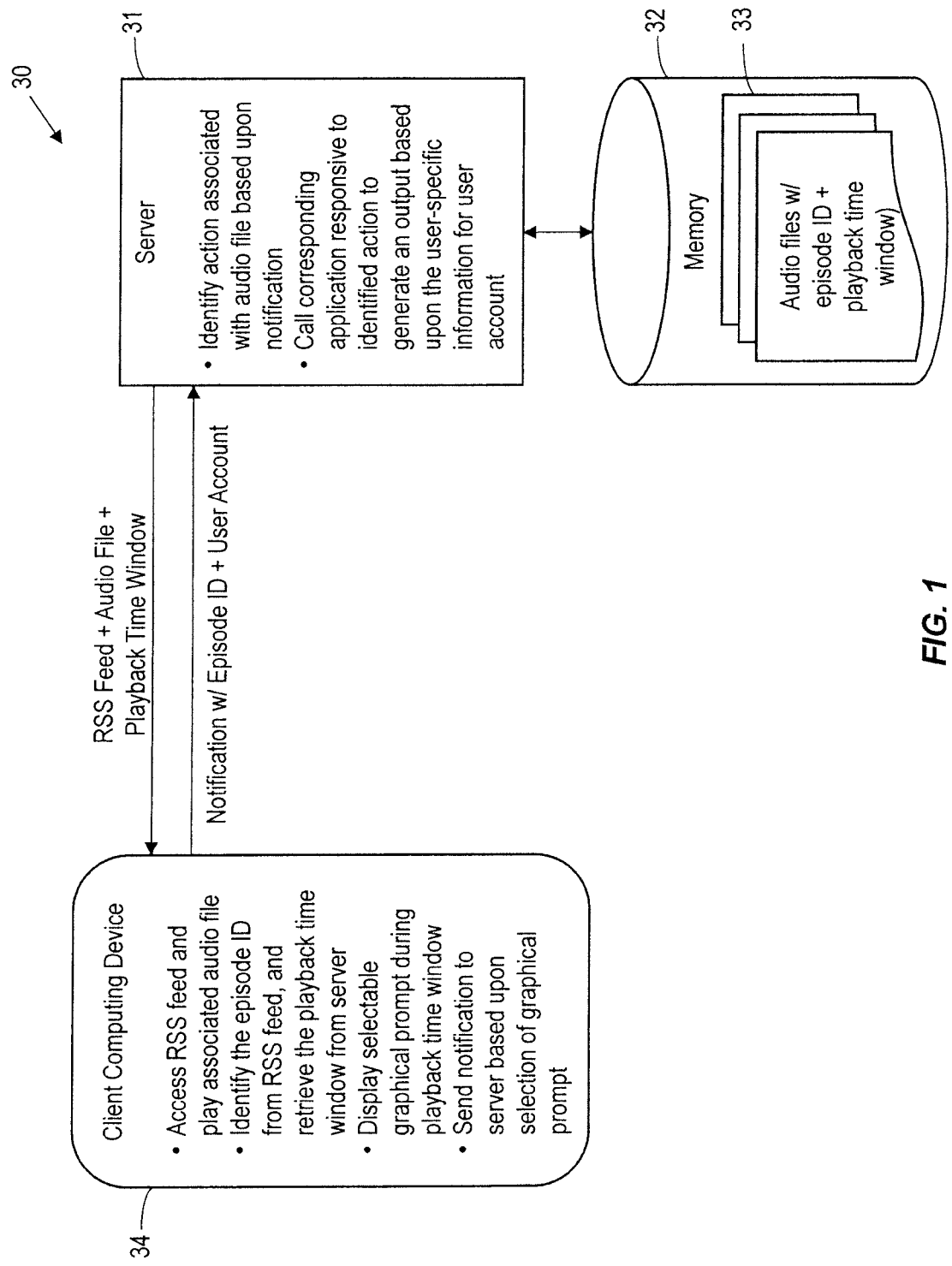
FIG. 1 is a schematic block diagram of a computer system providing enhanced audio playback control for audio files associated with Really Simple Syndication (RSS) feeds.
Figure 2:
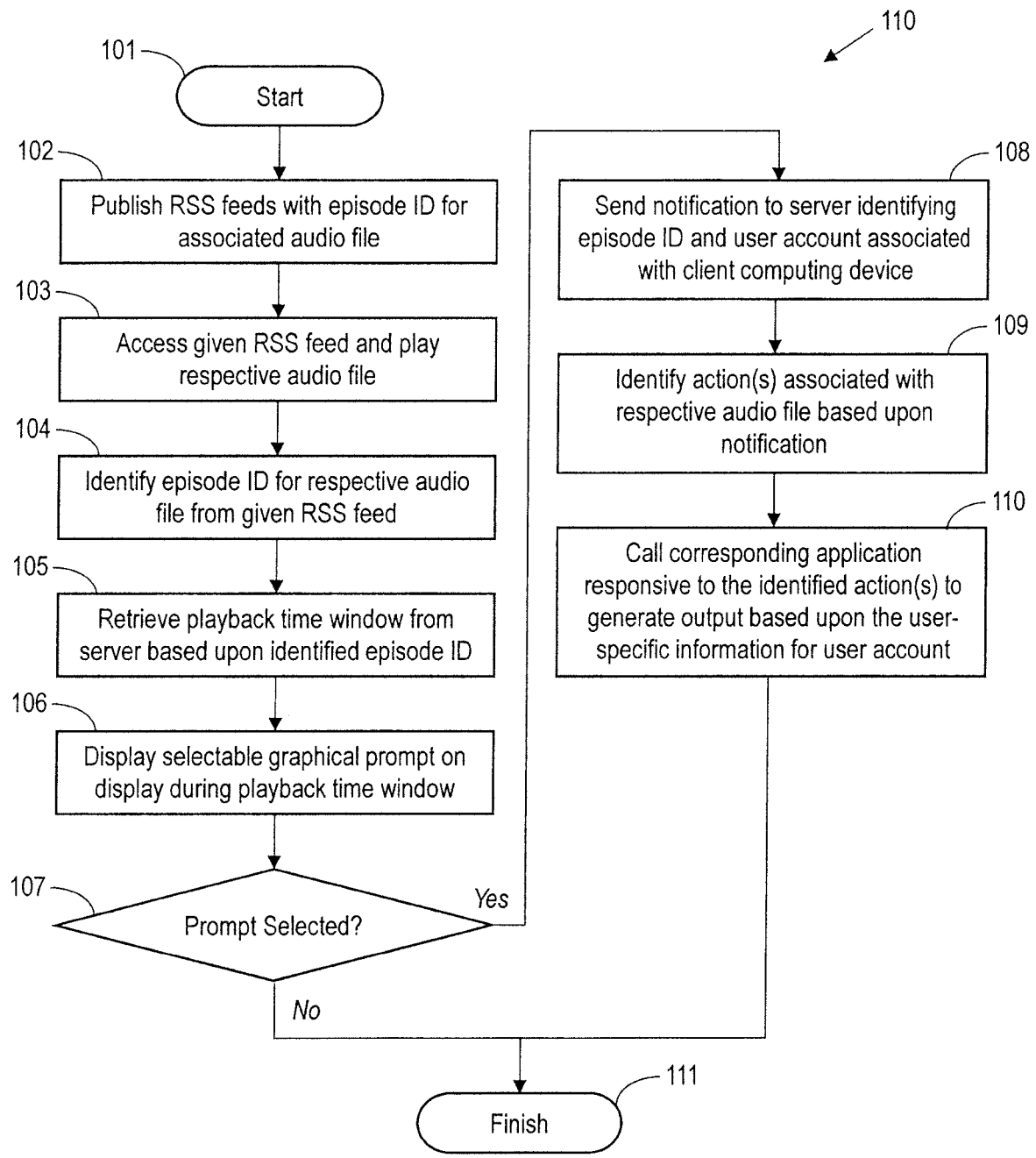
FIG. 2 is a flow diagram illustrating example method aspects associated with the system of FIG. 1.
Figure 3:
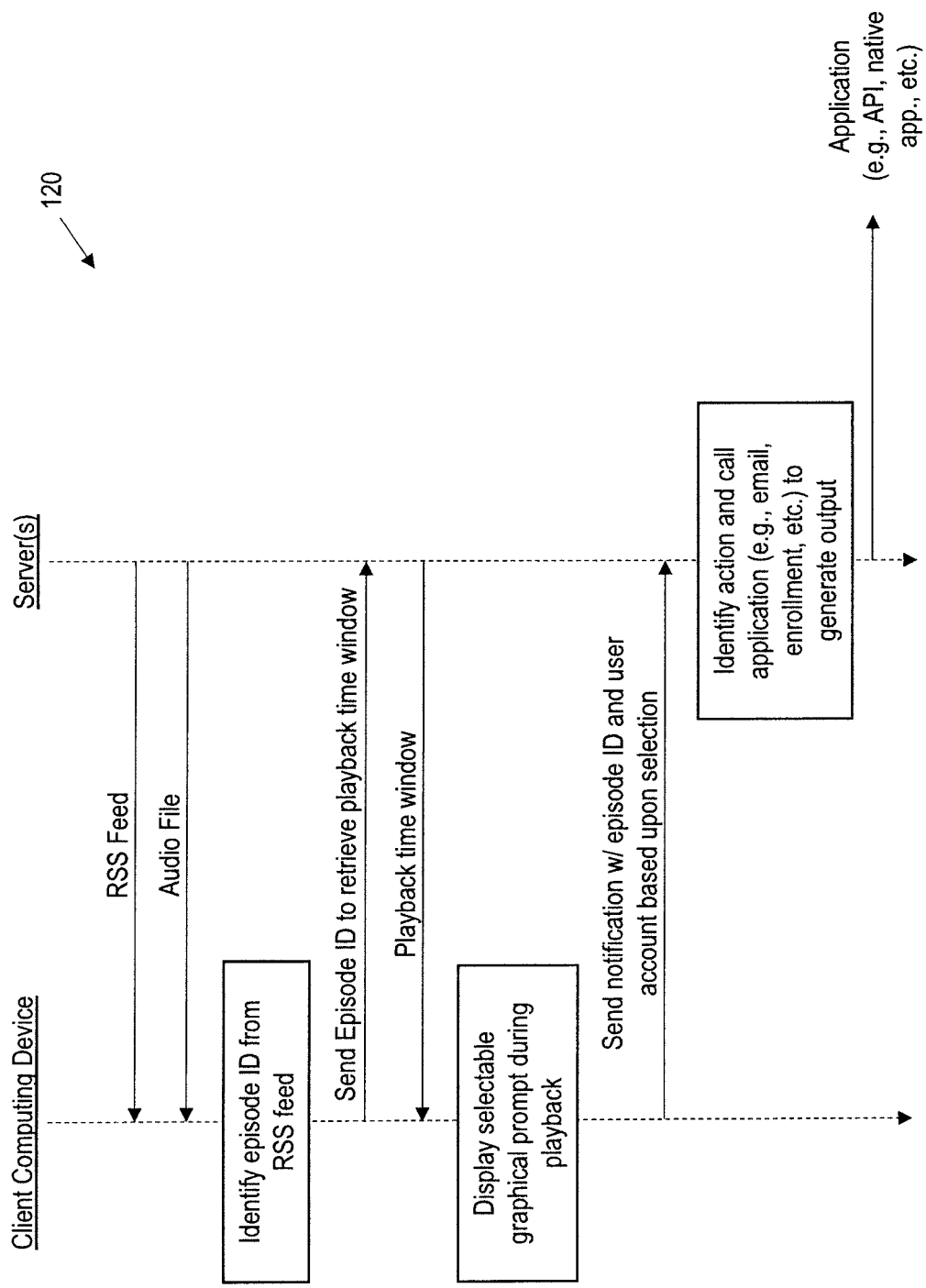
FIG. 3 is a sequence diagram illustrating example method aspects associated with the system of FIG. 1.
Figure 4:
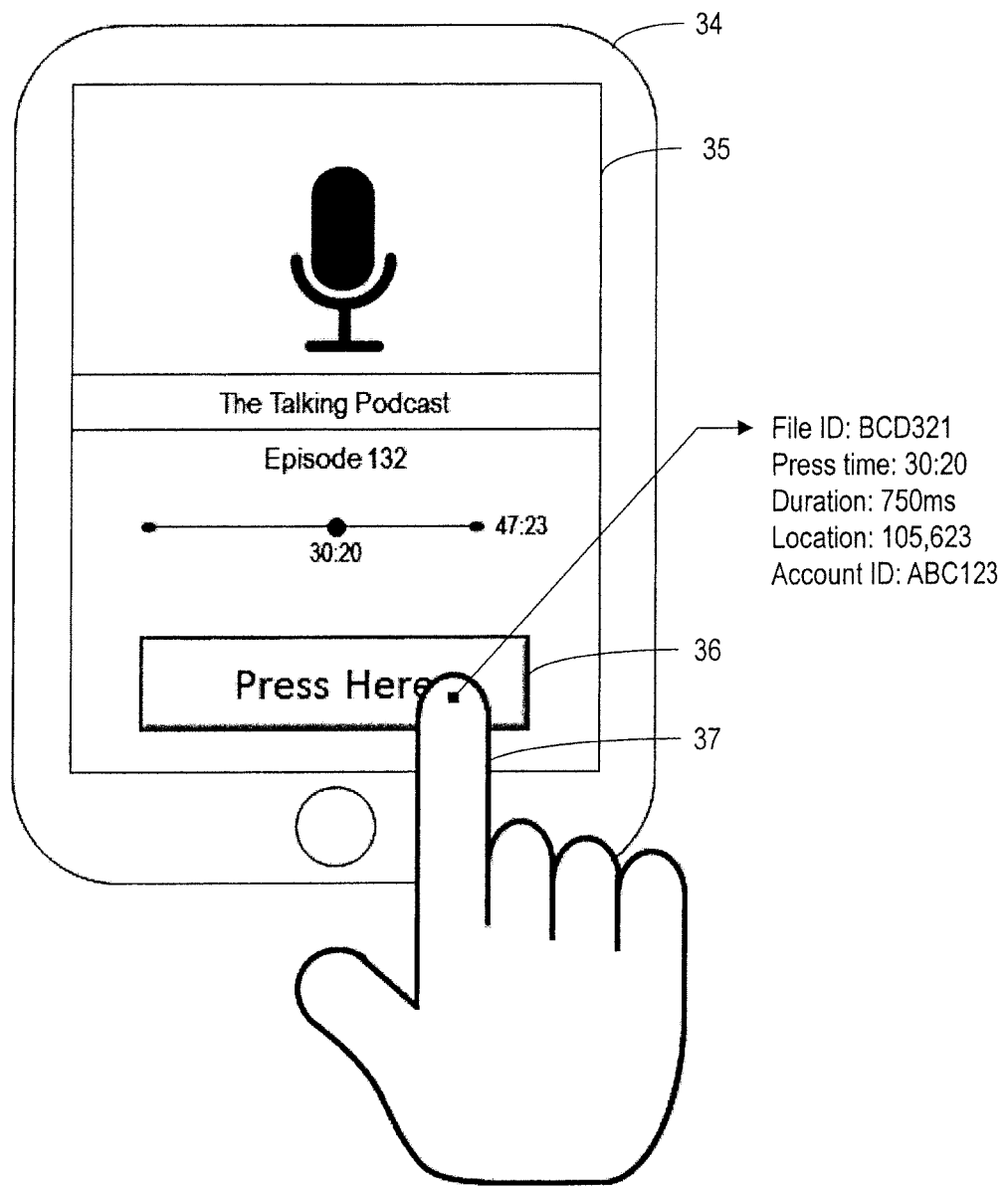
FIG. 4 is a front view of client communication device of the system of FIG. 1 illustrating user selection of a graphical prompt during a playback time window in accordance with an example implementation.

Referring initially to FIGS. 1 and 4, and the flow diagrams 100, 120 of FIGS. 2 and 3, a computer system 30 and associated method aspects are first described. Beginning at Block 101, the system 30 illustratively includes one or more servers 31 configured to publish RSS feeds (Block 102), each including a unique ID for an associated audio file 33. In the illustrated example, the audio files 33 are stored in one or more memories 32, which may be local to or remote from the server 31. Each audio file 33 has one or more actions pinned to a respective playback time window within the audio file from among a plurality of different actions, with the action(s) corresponding to content within the audio file during the playback time window, as will be discussed further below. The system 30 further illustratively includes one or more client computing devices 34 cooperating with the server(s) 31 to access a given RSS feed and play the respective audio file associated therewith, at Block 103. By way of example, the client computing devices 34 may be smartphones, tablet computers, desktop computers, laptop computers, etc.

At this point for a typical media player configured to play digital media files from an RSS feed, such players would provide little or no interactivity during digital media playback beyond play/pause and forward/reverse operations, and a time indicator showing the duration and current playback point. That is, the RSS feed essentially just identifies the file and its location at the server 31 (along with some other basic metadata), so that it can be downloaded (either by streaming or first downloading the full file in a local memory) and played. However, in accordance with the present approach, the client computing device 34 may advantageously be equipped with a digital media player program (e.g., implemented on a non-transitory computer-readable medium having computing executable instructions for causing the player to perform the functions described herein) that provides for additional levels of communication with the server 31 to provide enhanced playback interactivity features.

More particularly, the client computing device 34 identifies the unique ID for the respective audio file 33 from the given RSS feed, at Block 104, and retrieves the playback time window from the server 31 based upon the identified unique ID, at Block 105. Moreover, the client computing device 34 also displays a selectable graphical prompt 36 on its respective display 35 during the playback time window, at Block 106. In the example illustrated in FIG. 4, the client computing device 34 is a tablet computer with a touchscreen display 35, and it is running a podcast player program playing back a podcast called "The Talking Podcast". Here, the selectable graphical prompt 36 is a rectangular button that may be selected by a user's finger 37, stylus, etc., although various types and forms or prompts may be used in different embodiments, as will be discussed further below.

When the prompt 36 is selected, at Block 107, the client computing device 34 sends a notification to the server 31 based upon the selection, at Block 108. More particularly, the notification identifies the unique ID and a user-specific information account associated with a user or owner of the client computing device 34. For example, the owner of the client computing device 34 may have an account with the server 31 which in turn is identified by a unique ID (e.g., an email address, username, etc.). The account may store information about the particular user, such as her name, location, preferences, payment information, etc., as will be discussed further below. The notification from the client computing device 34 may accordingly include the unique identifier for the user's account (ABC123 in the example of FIG. 4), as well as the unique ID of the file being played (here BCD321). Thus, if the account information resides at the server 31 (or elsewhere, such as in the cloud), the server may access the respective user data. However, in some embodiments, the user-specific data could be sent directly from the client computing device 34 to the server 31, e.g., as part of the notification.

In some embodiments, the notification may include further information regarding the selection of the prompt 36. For example, the notification may identify the playback time at which the prompt was selected (here 30 m 22 s into playback), a duration of the selection (here 750 ms), and a location on the display where the selection or actuation occurred (here at the coordinates 105,623 for a 1024/768 display screen).

The server 31 may accordingly determine the respective action associated with the audio file identified in the notification, at Block 109, and accordingly call a corresponding application from among a plurality of different available applications to generate an output based upon the user-specific information associated with the user's account, at Block 110. Various examples of different types of applications and outputs will be discussed further below. The method of FIG. 2 illustratively concludes at Block 111.

With respect to a podcast episode ID, this is referred to as a GUID and will take the form of number associated with a URL for the show. Here is an example unique identifier link from the RSS feed for a podcast entitled "Excellence Expected":

<quid isPermaLink="false">https://www.excellence-expected.com/?p=3598</guid>

The owner of the RSS feed is identified as follows in the RSS feed (with contact email address redacted):

<itunes:owner>
    <itunes:name>Mark Asquith hosting with Chris Ducker, Ash Maurya, Adam Farah, Daniel Maw, Ayelet Noff, Theo Priestley, Kyle Wilkinson and Phil Pallen</itunes:name>
    <itunes:email>------------@me.com</itunes:email>
</itunes:owner>
Finally, an RSS feed URL for this show is listed in the RSS feed as follows:
<atom:link href="https://www.excellence-expected.com/category/current/feed/" rel="self" type="application/rss+xml" />

Figure 14:
FIGS. 14-16 are example database tables which may be used by the server of FIG. 1 for associating playback windows and respective actions with digital media files.
Figure 17:
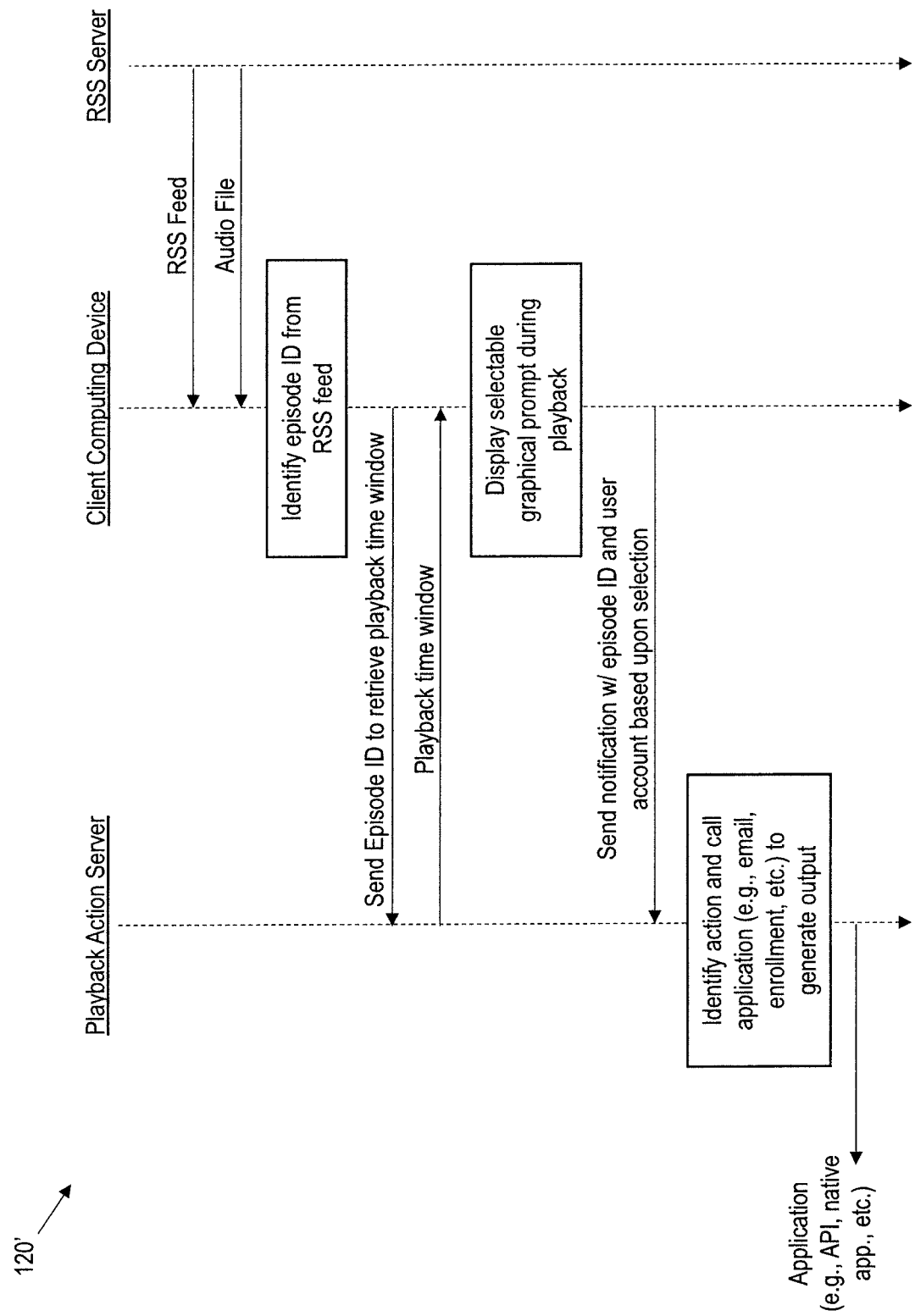
FIG. 17 is a sequence diagram similar to FIG. 3 illustrating operation of the system of FIG. 1 where the RSS/audio hosting server and playback action server are separate.

The server 31 may maintain a database listing the various media files it hosts, along with the respective actions and playback time windows associated with each. The server 31 (which in some embodiments may be a separate server from the one hosting the audio file and/or publishing the RSS feed, as will be discussed further below with reference to FIG. 17) may accordingly use the above-noted information from the RSS feed (which is provided by the client computing device 34 in its notification that the prompt 36 has been selected) to identify the respective files and associated actions from the database. For example, the feed URL may be used as the main identifier for a show on the database schema. The feed URL is a common identifier among podcast players (e.g., Apple Podcasts, Google Podcasts, etc.), and the feed URL may be linked to a "show ID" in the database. The episode identification information from the RSS feed may be added to the database and linked to a respective episode ID in the database associated with the file, which may in turn link the respective timestamps and actions with the episode in question. An example database table 140 is provided in FIG. 14 showing how an episode ID (here 1) and show ID (here 2) may be linked to the RSS GUID information noted above.

Furthermore, the owner information from the RSS feed may optionally be used to verify that the person who attempts to set up the show for interactive functionality through the server 31 is indeed the owner of the show. In this instance it would mean that when the "podcast owner" of "Excellence Expected" wants to claim his show on the server 31, he may use any email address he wants for contact purposes, but when it comes to actually getting the show approved an email will be sent to the "iTunes Owner Email" asking for approval. This may advantageously help stop others from trying to take over someone else's show without approval.

Figure 15:
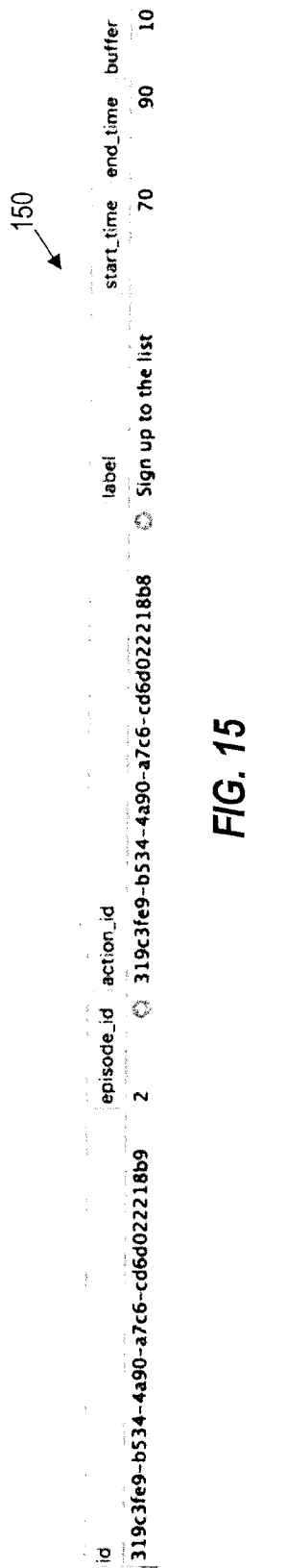
Figure 16:

As noted above, episode actions may be linked to the episode ID in the database schema, as seen in the table 150 of FIG. 15. In this example, for episode 2 there is a start time and an end time (in seconds) defining the playback window during which the client computing device 34 will display the appropriate prompt 36 on the display 35, as well as a manual buffer (in seconds) which may be used to help early or late selections of the prompt on either side of the playback window, as will be discussed further below. As seen in the table 160 of FIG. 16, the action ID (here "optin") may be linked to a specific action for this user, and this action may optionally be linked to multiple episodes as well.

The table 160 further links a respective service (services_id) to the action. More particularly, a service is a connection to an application or program such as an external Application Programming Interface (API) or internal module at the server 31 which will then complete the appropriate action on behalf of the user. As will be discussed further below, this could be an opt-in form service such as MailChimp or AWeber integration for subscribing to an email list, purchasing specific merchandise from a designated merchant, or even a micro payment gateway for donations/sales. Another example application would be an internal API to a polling module (e.g., for voting or taking quizzes, for example). The server 31 is also able to provide the particular user specific data from the user's account to the service that is needed to perform the given action (e.g., email address, payment information for donations/orders, size for ordering clothing items, etc.).

To be even more specific, extra values may optionally be added to a specific action in the database, depending on what type of action it is. For example, in addition to signing up for an email list with an associated email distribution service, a tag may also be assigned to designate where the requested action came from so that the new entry in the email list will also indicate that this new lead or referral came through the server 31 (as opposed to being added to the email list from a website visit, etc.). Once the particular action is setup, for any client computing device 34 that has the above-noted player functionality enabled, when the user selects the prompt 36 the client device will send a request or notification to the server 31. As noted above, this request message may include the exact time of the playback (e.g., in seconds) where the selection occurred, how long the selection lasted (e.g., length of a button press), the location on the screen of where the selection or actuation occurred, along with the user account information (which may be a user ID to identify the account, from which the server obtains the information, or this information may be included directly in the message, for example).

The playback time window, buffers, and associated actions may be configured by the owner of the podcast episode when loading the episode to the server 31 for publication. That is, an interface may be provided allowing the owner to select predefined actions and selectable prompts 36, and assign the start and end times (and therefore the length) of the playback time window during which the corresponding prompt(s) for this action(s) will be displayed. As will be discussed further below, multiple playback time windows for respective actions may be located at different positions in the playback.

With respect to user accounts and the user-specific information associated therewith, the email address and name of the user, along with any other pieces of personal data that the user has supplied (e.g., shirt sizes, color preferences, etc.) will come from the user ID which is linked to that user. The user ID may be considered a box that stores all the information for this specific user, when an action is taken the relevant program and/or action and service will request specific pieces of data from this "box". For example, on an email list opt-in action, the "Name" and "Email Address" of the user will be obtained from the account, but for a T-shirt order "Size", "Color", and "Payment Information" will be used, i.e., those fields which are specific to the respective service and action.

Note that in some embodiments users may decide whether to share their information with server 31 on a one-off basis (when an action is pressed, the user is prompted—"Do you want to share this information?") or a "macro" level, i.e., when they first sign up with the server 31, they may be asked "Do you want to share your data automatically every time".

Figure 9:
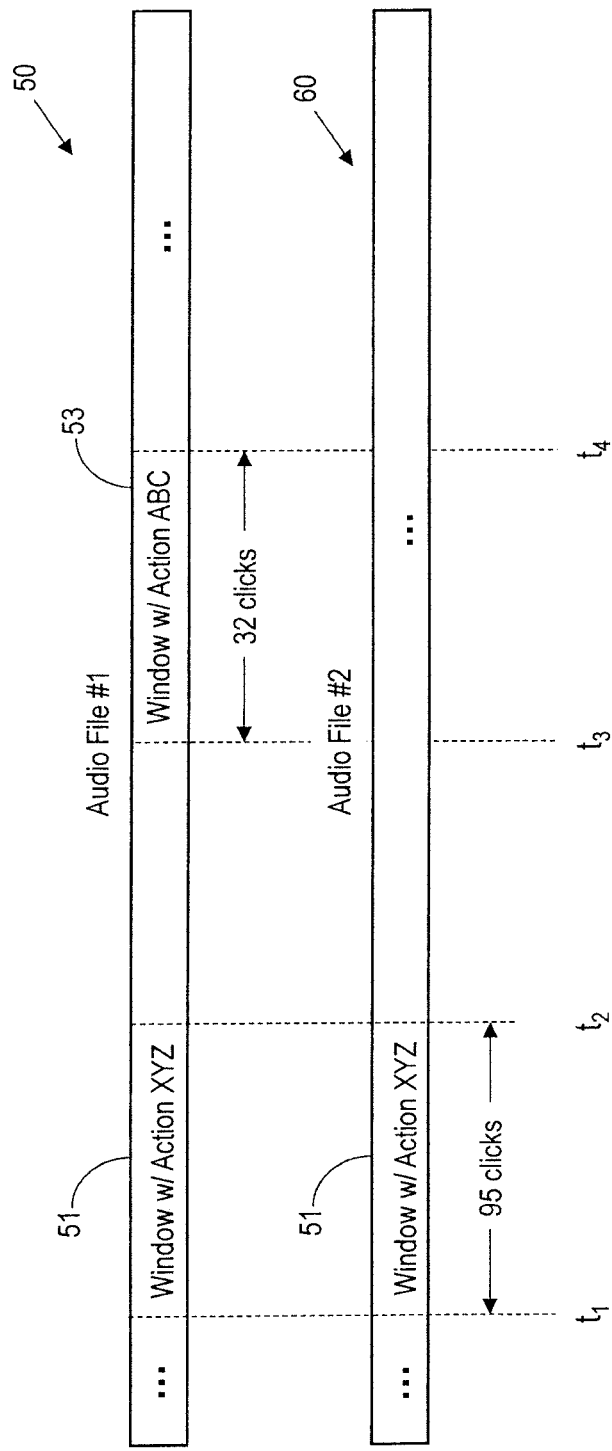
FIG. 9 is a diagram illustrating playback of different audio files using the system of FIG. 1 in an example embodiment where both files have a common playback time window associated therewith.
Figure 11:
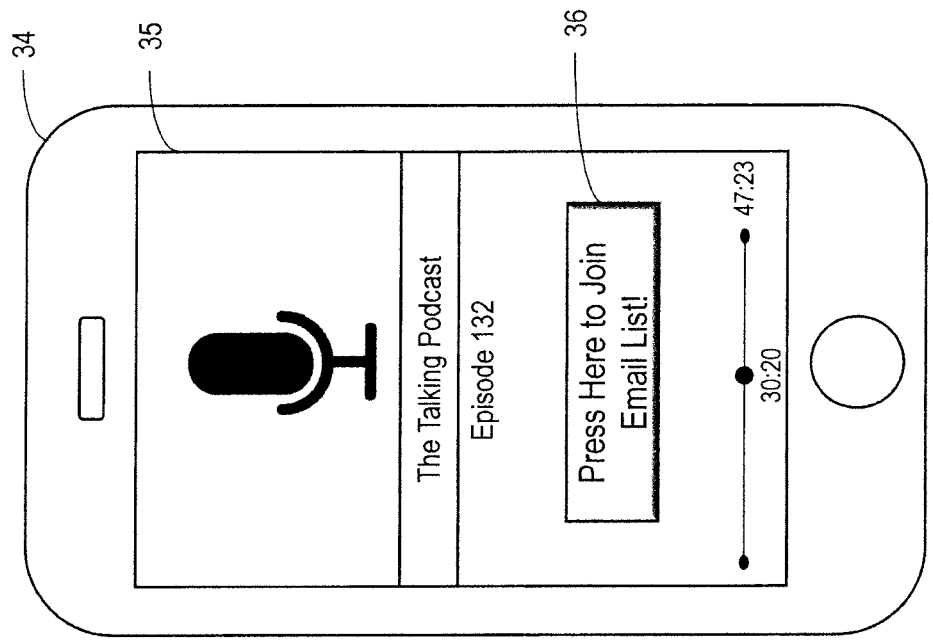
FIGS. 10-13 are front views of a client computing device for use with the system of FIG. 1 illustrating different example selectable graphical prompts for respective actions associated therewith.

In addition to allowing owners to manually set the buffer times associated with each playback time window, the same playback time window (and optional buffers) may be assigned across multiple episodes of a show or series. That is, audio files associated with a show may have a shared action pinned to a same time window across all of the shows, as illustrated in the example of FIG. 9. Here, first and second audio files 50, 60 are different episodes of the same show. A first playback time window 51 with action XYZ associated therewith is pinned to each of the audio files from time $t_1$ to $t_2$. In this sense, this may be considered a global playback time window that is applied by the server 31 to all of the episodes associated with a given show. Moreover, the system 30 also advantageously allows episode-specific actions to be pinned to time windows in individual files, such as the window 53 in the file 50 (but not in the file 60), which extends from a start time $t_3$ until an end time $t_4$. Furthermore, the global playback time windows and associated action(s) may be edited globally so that any changes propagate through to all of the episodes in the show when they are played back. Updates or changes may be made at any time after the show is published, if desired.

A significant advantage of the system 30 is that with data collected from user selection or "clicks" of the prompt 36 over time, the server 31 may perform machine learning to determine what the best buffer time and/or start/stop times will be. In an example embodiment, a setting may be provided to have the buffer move automatically based upon the machine learning, or just suggest it on an episode-by-episode basis (or global basis such as in the example of FIG. 9) where it is determined that significant improvements may be achieved through changing the start/stop time, and/or the buffer times.

Figure 5:
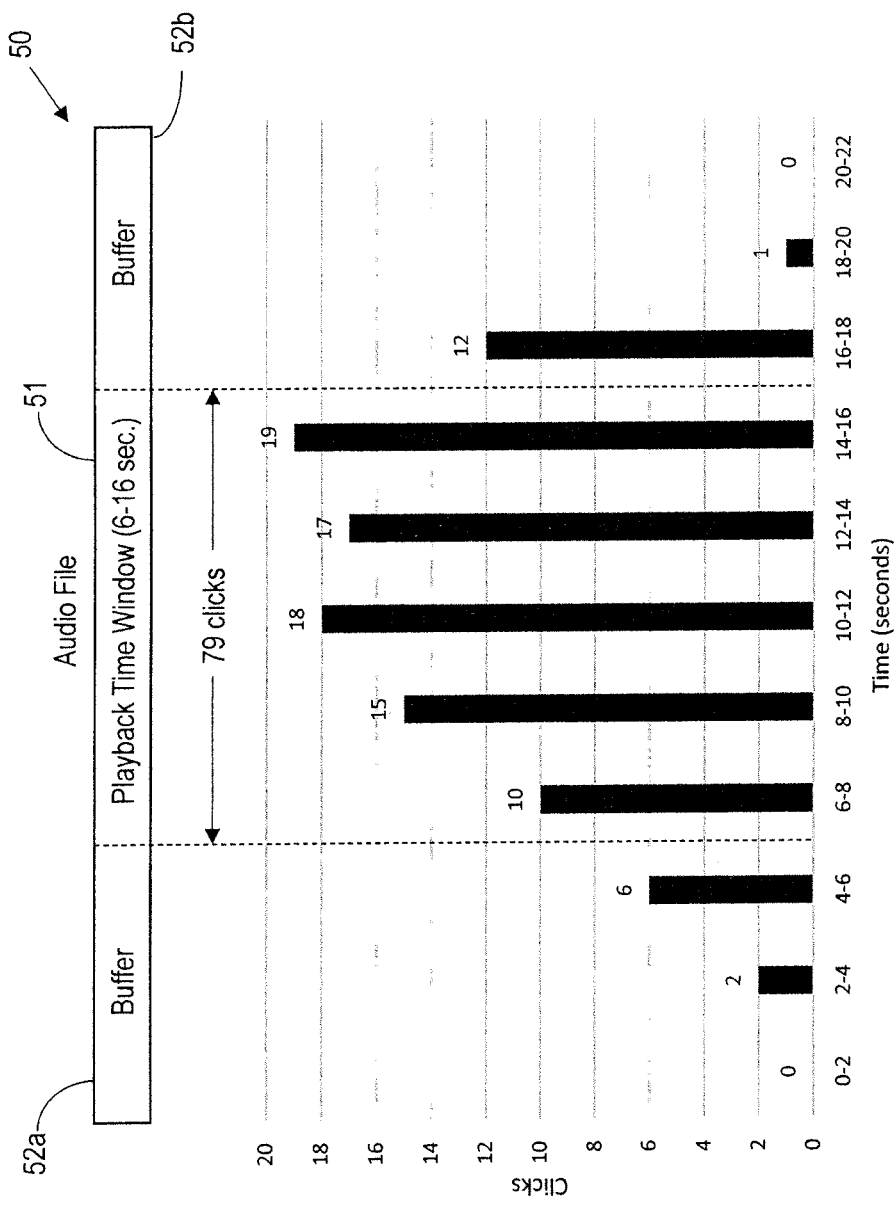
FIGS. 5-7 are diagrams of an example audio file playback using the system of FIG. 1 with associated charts of graphical prompt selections associated with a playback time window.
Figure 6:
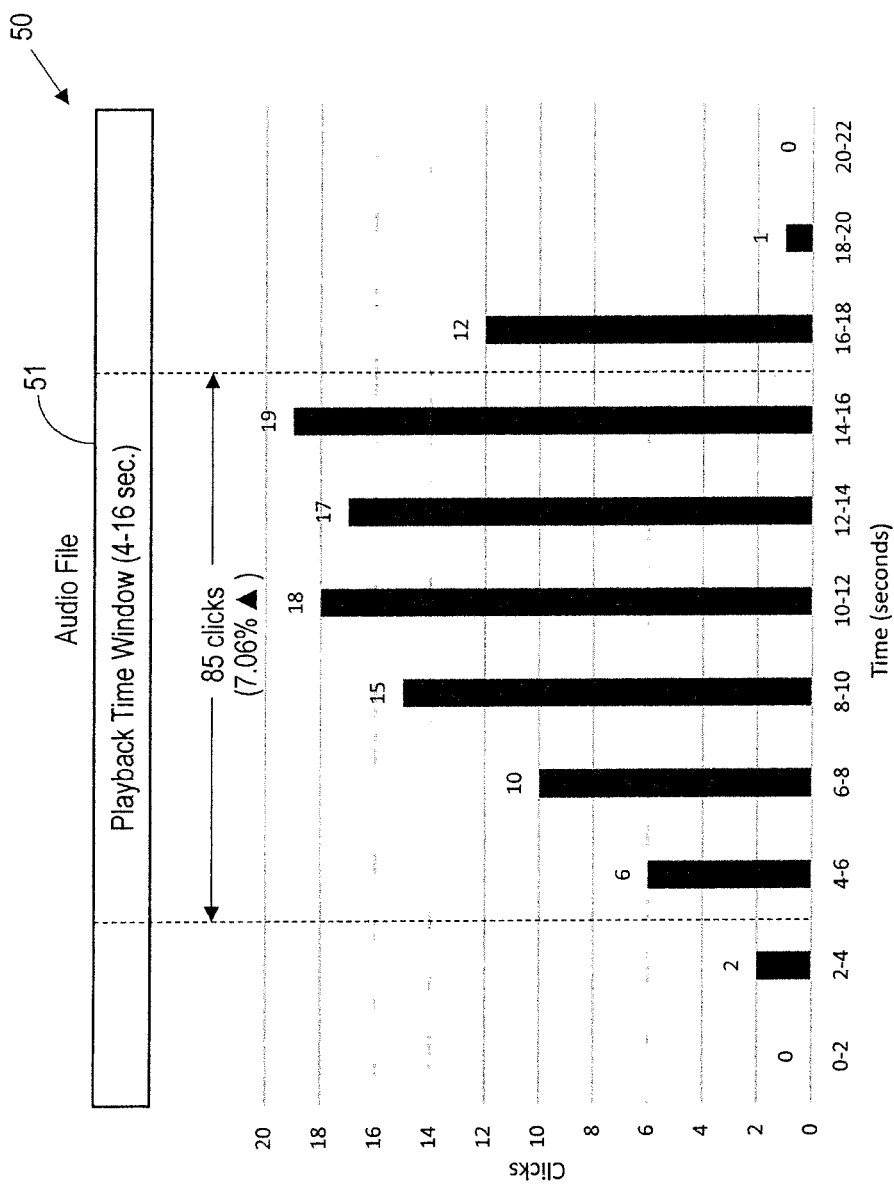
Figure 7:
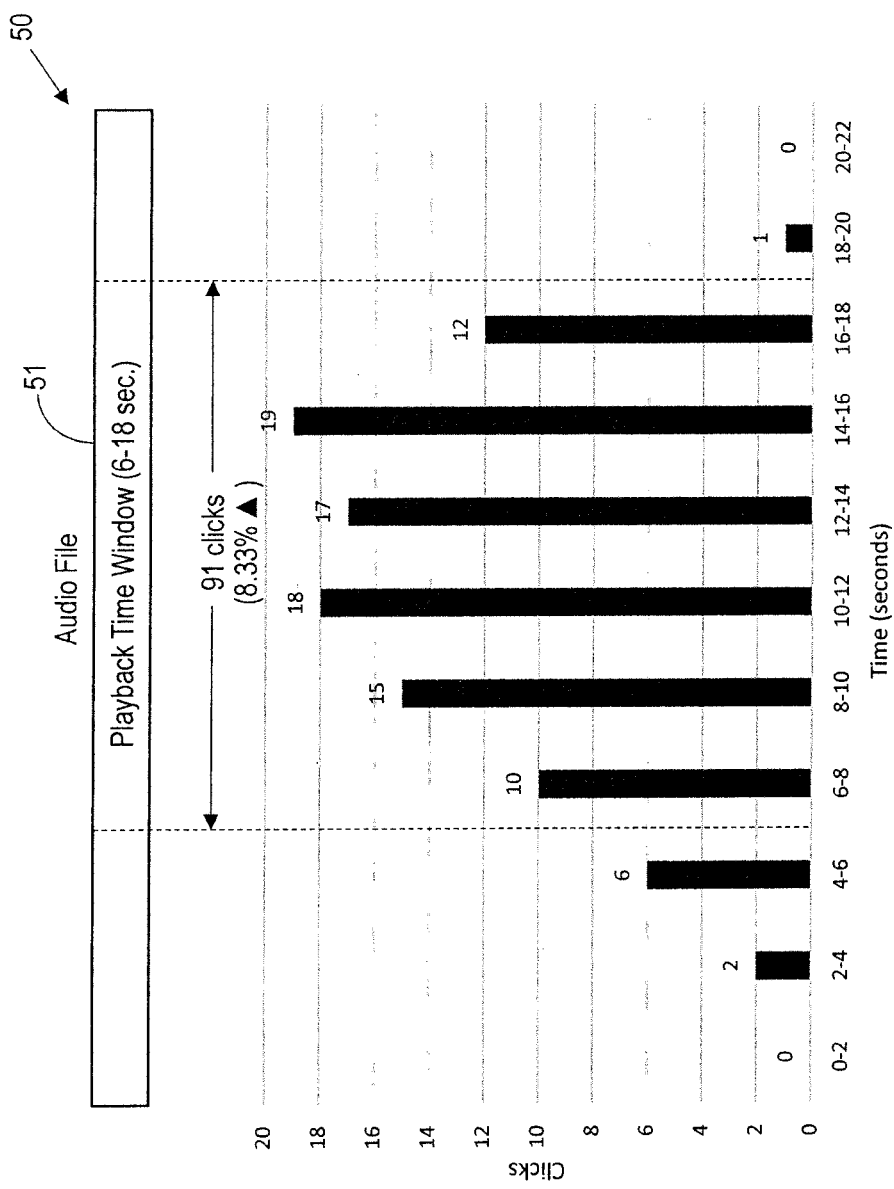

Turning now to FIGS. 5-7, this will be further understood with reference to an example implementation in which an audio file 50 has a playback time window 51 extending from 6 to 16 seconds during playback, and the 6 second periods before and after the playback time window are designated as buffers 52a, 52b. Note that this example only shows a 22 seconds section of the audio file 50 for clarity of illustration, but the length of the file may extend beyond the buffer regions 52a, 52b. In the present context, a "buffer" is a piece of time before and after a "call to action" in the audio playback which can be specified by the podcast owner and/or the machine learning of the server 31 which is intended to capture potential missed clicks, e.g., where a call to action which is 1 minute long and the user presses the display 35 at 1 minute 15 seconds. The buffers 52a, 52b advantageously allow the intent to interact to still be captured.

As the audio file 51 is played multiple times by different client computing devices 34 configured to cooperate with the server 31 (i.e., having the appropriate player installed), the number of selections of the prompt 36 are recorded by the server. In this example, 79 selections or "clicks" have been recorded within the playback time window 51, while 8 were recorded within the buffer 52a, and 13 within the buffer 52b.

The clicks outside of the playback time window 51 may occur for various reasons. For example, the call to action within the audio file may not be properly timed with the playback time window 51, such that when the speaker in the audio asking the listener to vote, answer a question, sign up for an email list, place an order, etc., the beginning/end of the window does not coincide with the speaker's request for action by the listener. Another reason may be that the playback time window was initially set to be too short, thus not giving the listener adequate time to make a selection due to reaction time/decision making.

In any event, with the server 31 tracking clicks within the buffer regions 52a, 52b, this advantageously allows for an automatic adjustment of the playback time window 51 (or a suggestion to adjust it) when changing the start and/or end time would make a significant difference, e.g., when the change meets a desired threshold. For example, the threshold may be set to a 5% increase in the overall amount of selections occurring within the window. Thus, as seen in FIG. 6, moving the start time of the window 51 two seconds earlier (i.e., starting at 4 seconds into playback) would pick up 6 extra clicks (bringing the total from 79 to 85), and accordingly increasing the amount of users requesting the particular action by 7.06%. As such, the server 31 would either automatically change the start time for the window 51 in future playbacks for client computing devices 34, or generate a suggestion to the podcast owner to make this change, for example. Similarly, moving the end time out by two seconds (i.e., to 18 seconds into playback) would increase the total clicks from 79 to 91, an 8.33% increase which again would warrant a change (or recommended change) to the window 51 end time.

On the other hand, in this example moving the start or end times back or forward any further would not pick up any significant amount of additional clicks (i.e., the percentage increase would be below the threshold of 5% in this example), and thus no further adjustment (or adjustment recommendation) by the server 31 would be appropriate. Thus, it may be considered that any such clicks occurring in these regions were accidental or unintended as they are deemed statistically insignificant. Accordingly, through the machine learning the server 31 may dynamically adjust the playback time window 31 over time to help maximize the capture rate of user selection, yet not leave the prompt 36 on the display 36 so long that it becomes an inconvenience or bother to the listener. In this regard, the server 21 may also shrink the playback time window 51 if there are little or no clicks near the beginning or ending times. It should be noted that other threshold percentages may be used in different embodiments, and that other types of thresholds may be used as well (e.g., based upon a number of clicks, etc.).

Figure 8:
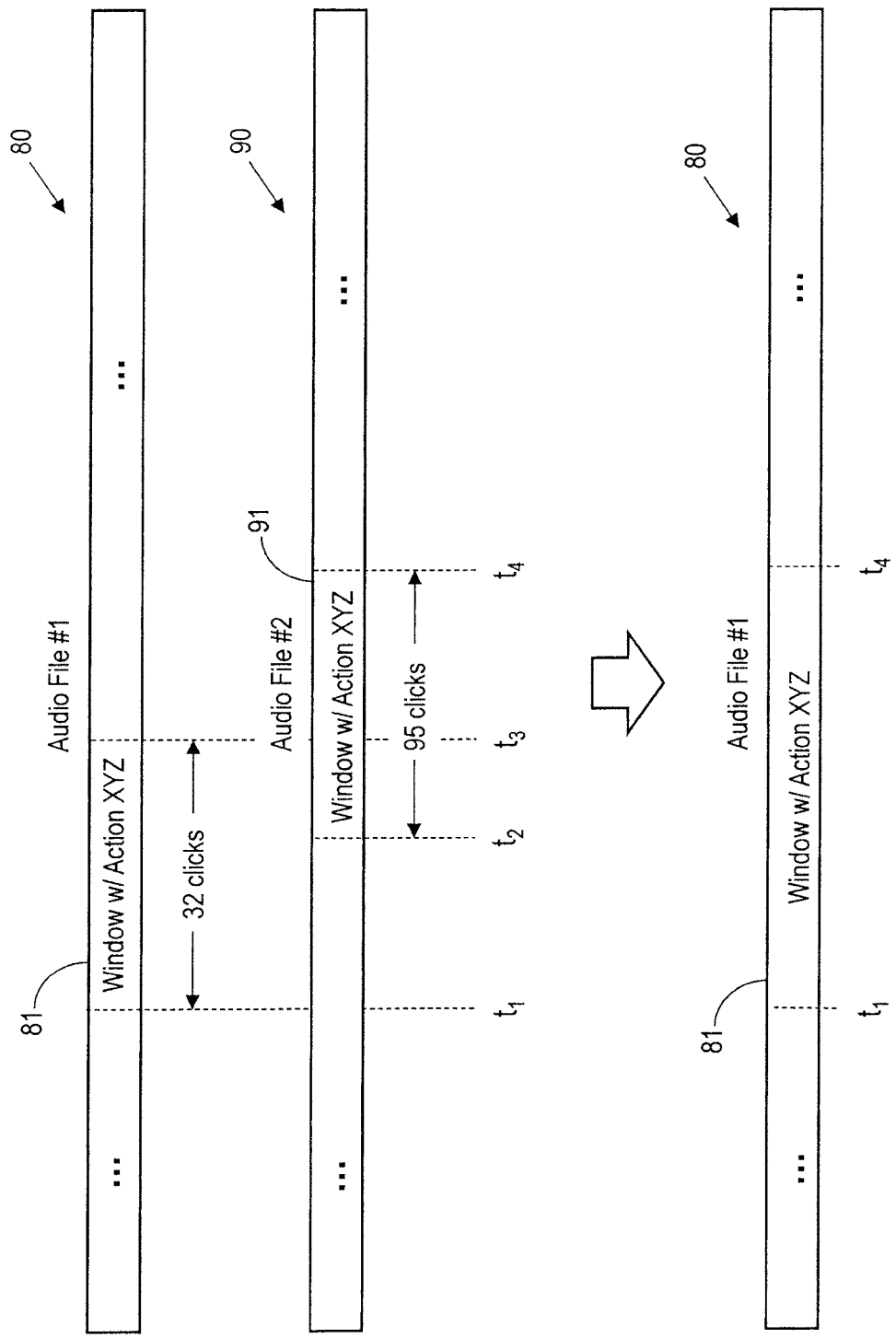
FIG. 8 is a diagram illustrating playback of different audio files using the system of FIG. 1, and how graphical prompt selection for one of the audio files may be used for changing the playback time window of another audio file in accordance with one example aspect.

Similarly, the server 31 may compare two different audio files having a same prompt 36 therein, and adjust a start/stop time of the window in one of the files based upon a higher click rate from the other file. In the example of FIG. 8, a first audio file 80 has the prompt 36 pinned to a playback time window 81 extending from times $t_1$ to $t_3$, while a second audio file 90 has the same prompt pinned to a playback time window 92 extending from times $t_2$ to $t_4$. While the prompt 36 in the first audio file 80 only receives 32 clicks from listens by client computing devices 34 during the playback time window 81, the same prompt receives 95 clicks during the playback time window 92 in the second audio file 90. As such, the ending time for the playback time window 81 in the first audio file 80 may be changed to time $t_4$.

The machine learning implemented by the server 31 may also advantageously provide suggestions for lengths and locations of playback time windows at a global or macro level across different shows (or digital files from different owners). That is, the server 31 may make suggestions based on show trends and/or episode trends for other episodes of similar lengths to give a truer reflection on global listener interaction trends. For example, a 30-minute episode might have increased interactions with 1-minute interaction periods, whereas a 7-minute show may generally find enhanced results with a 25 second interaction period. Similarly, the most advantageous start times for the playback time window 51 may also be different for different lengths of shows. As such, owners will know where best to locate pre-roll, mid-roll, etc., calls to action based upon the length of their show in view of the global trends collected through machine learning over time.

Figure 10:
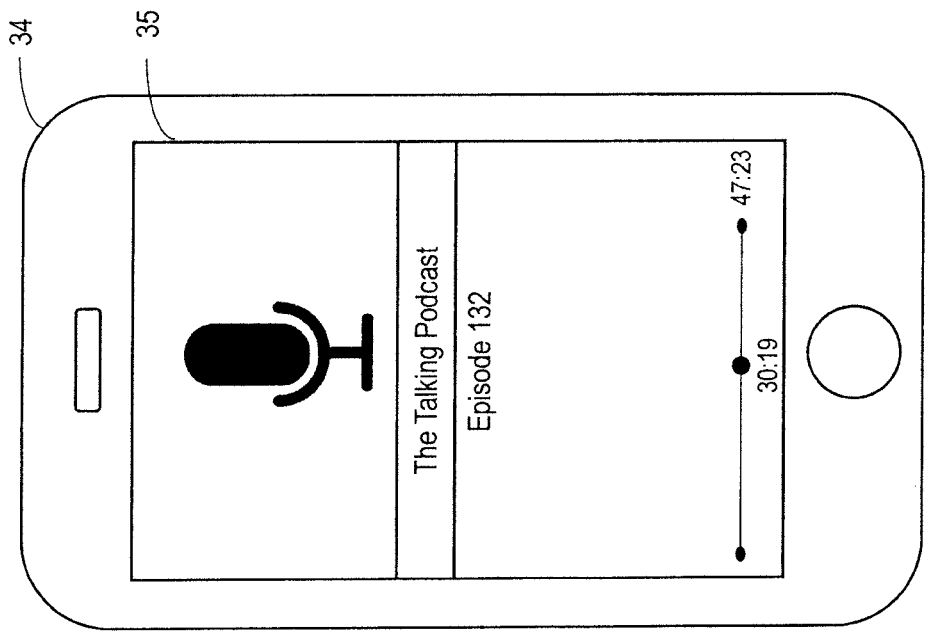

Turning now to FIGS. 10-13, various example actions and associated selectable graphical prompts which may be used in different embodiments are now described. In the example shown in FIGS. 10-11, a prompt 36 appears on the display at 30:20 in playback (i.e., the beginning of the playback time window), but at the time just before this (30:19) no prompt is displayed (FIG. 10). In this example, the prompt corresponds to an email list subscription module, which will cause the client computing device 34 to send user-specific data for the associated user to the server 31 (e.g., "Email Address" and "Name"), and after the associated location of the action in the database (as discussed above), the server is able to call the appropriate API/service (e.g., AWeber, MailChimp, ConvertKit, InfusionSoft, etc.) or program to add the user to the respective email list.

Another email module may be to send a single email to a user responsive to selection of the prompt 36. For example, the call to action may be to receive an information packet or offer. Once the client computing device 34 notifies the server 31 of the click and user-specific information (e.g., user's name and email address), this module may then send an email to the email address with the associated information from the sponsor, etc.

Figure 12:
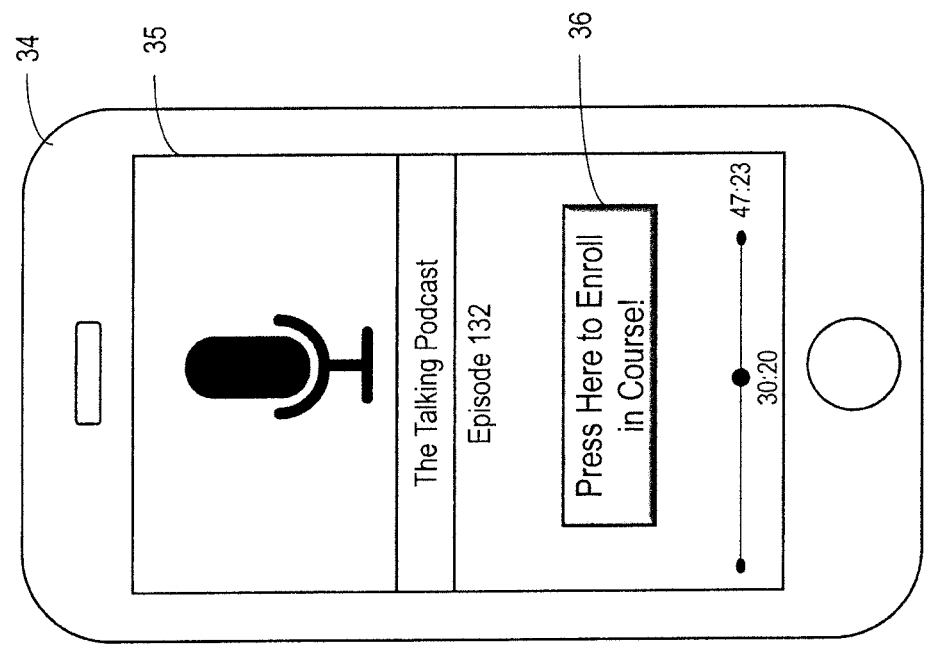

In the example of FIG. 12, the prompt 36 is for a course/membership enrollment module. Using the above-described approach, such modules may advantageously sign a user up to memberships or courses. Again, the server 31 will receive information such as "Email Address", "Name" and if any payment is needed to enroll, the appropriate payment information. The server 31 may then make the call to the appropriate APIs/services (e.g., Thinkific, MemberPress, etc.) and payment service where appropriate.

Figure 13:
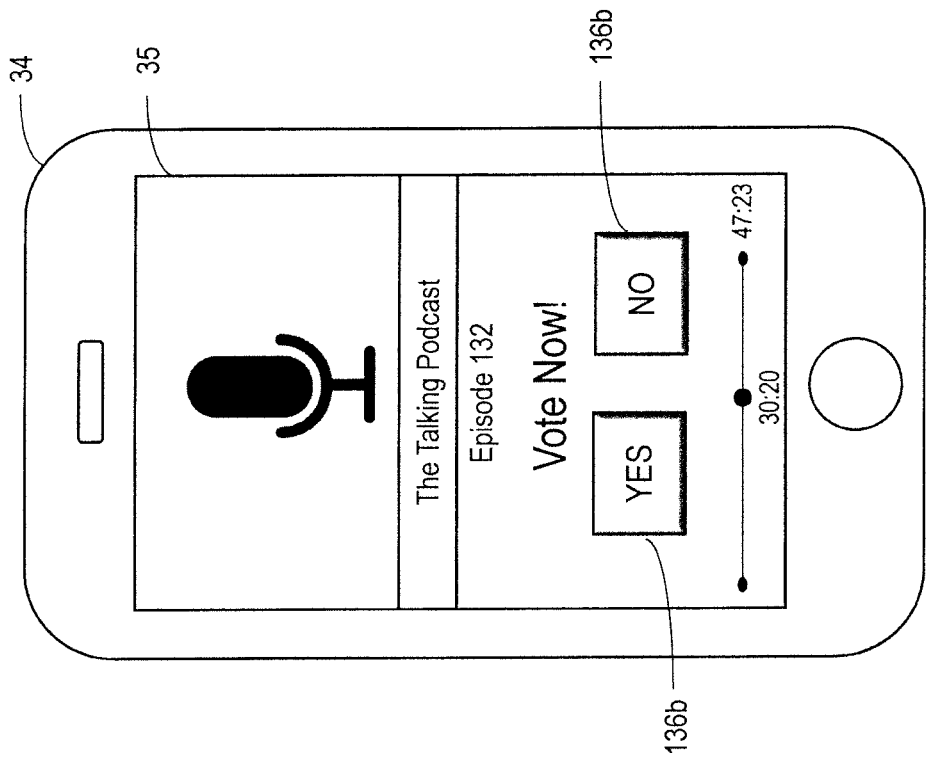

In the example of FIG. 13, multiple prompts 136a, 136b are displayed during the playback time window for different responses (here "yes" and "no") associated with a voting or polling module. This module advantageously provides the show owner an option of collecting different responses to a call to action, which is particularly beneficial for voting, taking a quiz (e.g., a true/false or multiple choice quiz), etc. Moreover, the vote could be anonymous (i.e., no user-specific data is sent to the server 31), or it can be set to gather the "Email Address" and "Name" as described above. It should be noted that while rectangular click buttons are shown in all of the examples of FIGS. 11-13, other shapes and/or types of selectable user prompts may be used in different embodiments (e.g., radio buttons, check boxes, etc.) and customized in terms of color, etc. Moreover, the location (coordinates) of the click provided by the client computing device 34 may be used to determine which of the buttons 136a, 136b was clicked, for example.

Another example module is a merchandise module. Using these modules a listener may purchase specific merchandise such as hats, shirts, etc. to support the podcast they are listening to. The server 31 will receive the appropriate data previously provided by the user such as "Size", "Color", "Delivery Address", etc., relating to this order. The user may be prompted to pay using a payment service, or if one is already saved in the user's account with the server then the payment may also be handled directly by the server 31.

Another similar module is a donation module. These modules are specific to donating to a podcast and may call an API/service (e.g., Patreon, etc.) allowing the user to donate a designated amount of money (e.g., a default amount set by the show owner). In such case, the server 31 will receive user specific data such as "Email Address" and "Name", "Payment Information", etc. Again, the payment process may be handled by the server 31 as described above, or the user prompted to complete the transaction on her own.

Still another advantageous module that may be implemented with the system 30 is a communications module. This module may integrate directly with communications platforms such as Bonjoro, Intercom, etc. For example, in the case of Bonjoro, clicking on the prompt would add a "Bonjoro" to the approved account. The server 31 would receive user specific data including "Email Address" and "Name", for example, to initiate the Bonjoro account addition.

Another similar module would be for integration to workflow or task automation platforms, such as Zapier, for example. For example, this will allow show owners to create their own "Zaps" using web hooks feature. Zapier can then link to different endpoints creating a bridge (e.g., pressing the prompt on the display may add the user to an excel document which is stored on Google Drive.)

Yet another module is a "Create Your Own Adventure" module, which will allow the listener to be able to to change either the ending or sections of a podcast in different ways. For example, the listener could select one of multiple different endings to a story, select whether to listen to bonus content associated with an episode, play a prior episode of the podcast, etc.

It should be noted that while the example embodiments provided above were with reference to podcast audio files, various other implementations are also possible. For example, the digital files associated with the RSS feeds may be other types of audio and/or video files, such as music files, news updates, etc. Moreover, the above-noted approach may be used with other files types besides RSS in some embodiments, such as XML files, for example.

It should be noted that the various functions of the server 31 relating to determining the selected action and performing the requested action for the respective user may be on the same server hosting the podcast, or this may be done at a separate server, e.g., by a different entity than the podcast hosting service. As seen in the sequence diagram 120' of FIG. 17, the client computing devices 34 may access an RSS feed published by a first server (namely the "RSS Server" in FIG. 17, which could be the site hosting the podcast, or a podcast directory such as Apple Podcasts, etc.), and then communicate with a separate server or service (the "Playback Action Server" in the example of FIG. 17) to obtain the playback time window, etc., and cause the associated actions to be performed based upon graphical prompt selection by users. In this regard, the separate service may be used with multiple different podcast hosting services to advantageously provide the enhanced interactivity and automated action performance features across different podcasting platforms.

It will accordingly be appreciated that the system 30 advantageously provides an approach to overcome the shortcoming associated with the playback of digital media files associated with RSS feeds. That is, the client computing device 34 and server 31 cooperate to form a separate communications link to exchange information not otherwise transferrable via the simple RSS format, and thereby provide enhanced interactivity and computing operations that would otherwise not be possible with a typical player accessing RSS feeds.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computer system comprising:
    a Really Simple Syndication (RSS) server configured to publish RSS feeds each including a unique identifier (ID) for an associated audio file, and each audio file having at least one action pinned to a respective playback time window within the audio file from among a plurality of different actions, the at least one action corresponding to content within the audio file during the playback time window, and the playback time window having a start time and an end time;
    a playback action server configured to store the different actions and the respective playback time windows; and
    a client computing device configured to
        access a given RSS feed from the RSS server via a first communications link and play the respective audio file associated therewith,
        identify the unique ID for the respective audio file from the given RSS feed, and retrieve the playback time window from the playback action server via a second communications link different than the first communications link based upon the identified unique ID,
        display a selectable graphical prompt on the display during the playback time window, and
        send a notification to the playback action server via the second communications link based upon selection of the selectable graphical prompt identifying the unique ID and user-specific information associated with a user of the client computing device;
    wherein the playback action server is further configured to identify the at least one action associated with the respective audio file based upon the notification, and call a corresponding application from among a plurality of different applications responsive to the identified at least one action to generate an output for the user based upon the user-specific information;
    wherein the client computing device is configured to collect user selections within a buffer period of the time window;
    wherein the playback action server is further configured to change at least one of the start and end times of the playback time window based upon user selections collected during the buffer period exceeding a threshold percentage of total user selections collected during the playback time window.

2. The computer system of claim 1 wherein the playback action server is further configured to change at least one of the start and end times of the playback time window for a first audio file based upon receiving a higher number of selections during a time window for a second audio file different than the first audio file.

3. The computer system of claim 1 wherein the client computing device is configured to determine a selection duration from selection of the selectable graphical prompt; and wherein the playback action server is configured to change at least one of the start and end times of the playback time window based upon the selection duration.

4. The computer system of claim 1 wherein the at least one action comprises a plurality of different actions; and wherein the selectable graphical prompt comprises a respective region corresponding to each of the different actions.

5. The computer system of claim 4 wherein the client computing device is configured to determine a selection location where selection occurs on the display, and wherein the playback action server is configured to determine a selected action from among the plurality of different actions based upon the selection location.

6. The computer system of claim 1 wherein audio files associated with a same show ID have a shared action pinned to a same time window therein.

7. The computer system of claim 6 wherein the audio files associated with a same show ID also have different actions pinned to different time windows therein.

8. The computer system of claim 1 wherein the playback action server is configured to call a corresponding application programming interface (API) responsive to the identified at least one action.

9. The computer system of claim 1 wherein at least one of the different applications comprises an electronic mail (email) application configured to output an email message based upon the user-specific information.

10. The computer system of claim 1 wherein at least one of the different applications comprises an enrollment application configured to perform user enrollment based upon the user-specific information.

11. A method comprising:
publishing Really Simple Syndication (RSS) feeds from an RSS server, each RSS feed including an unique identifier (ID) for an associated audio file, and each audio file having at least one action pinned to a respective playback time window within the audio file from among a plurality of different actions, the at least one action corresponding to content within the audio file during the playback time window;
at a playback action server, storing the different actions and the respective playback time windows having respective start and end times;
at a client computing device having a display associated therewith,
accessing a given RSS feed from the RSS server and playing the respective audio file associated therewith,
identifying the unique ID for the respective audio file from the given RSS feed, and retrieving the playback time window from the playback action server via a second communications link different than the first communications link based upon the identified unique ID,
displaying a selectable graphical prompt on the display during the playback time window, and
sending a notification to the playback action server via the second communications link based upon selection of the selectable graphical prompt identifying the unique ID and user-specific information associated with a user of the client computing device;
at the playback action server,
identifying the at least one action associated with the respective audio file based upon the notification, and
calling a corresponding application from among a plurality of different applications responsive to the identified at least one action to generate an output for the user based upon the user-specific information;
at the client computing device, collecting user selections within a buffer period of the time window; and
at the playback action server, changing at least one of the start and end times of the playback time window based upon user selections collected during the buffer period exceeding a threshold percentage of total user selections collected during the playback time window.

12. The method of claim 11 further comprising, at the playback action server, changing at least one of the start and end times of the playback time window for a first audio file based upon receiving a higher number of selections during a time window for a second audio file different than the first audio file.

13. The method of claim 11 further comprising:
at the client computing device, determining a selection duration from selection of the selectable graphical prompt; and
at the playback action server, changing at least one of the start and end times of the playback time window based upon the selection duration.

14. The method of claim 11 wherein the at least one action comprises a plurality of different actions; and wherein the selectable graphical prompt comprises a respective region corresponding to each of the different actions.

15. A non-transitory computer-readable medium having computer-executable instructions for causing a client computing device to perform steps comprising:
accessing a given Really Simple Syndication (RSS) feed from an RSS server via a first communications link and playing a respective audio file associated therewith, the RSS feed including a unique identifier (ID) for the associated audio file, and each audio file having at least one action pinned to a respective playback time window within the audio file from among a plurality of different actions, the at least one action corresponding to content within the audio file during the playback time window, and the playback time window having a start time and an end time;
identifying the unique ID for the respective audio file from the given RSS feed, and retrieving the playback time window from a playback action server via a second communications link different than the first communications link based upon the identified unique ID;
displaying a selectable graphical prompt on the display during the playback time window;
sending a notification to the playback action server via the second communications link based upon selection of the selectable graphical prompt identifying the unique ID and user-specific information associated with a user of the client computing device to cause the playback action server to call a corresponding application from among a plurality of different applications associated with the at least one action to generate an output for the user based upon the user-specific information; and
collecting user selections within a buffer period of the time window and sending the user selections to the playback action server, and changing at least one of the start and end times of the playback time window responsive to the playback action server based upon user selections collected during the buffer period exceeding a threshold percentage of total user selections collected during the playback time window.

16. The non-transitory computer-readable medium of claim 15 further having computer-executable instructions for causing the client computing device to determine a selection duration based upon selection of the selectable graphical prompt to cause the playback action server to change at least one of the start and end times of the playback time window based upon the selection duration.

17. The non-transitory computer-readable medium of claim 15 wherein the at least one action comprises a plurality of different actions; and wherein the selectable graphical prompt comprises a respective region corresponding to each of the different actions.

* * * * *